CONTACT STRUCTURE
Filed May 15, 1962
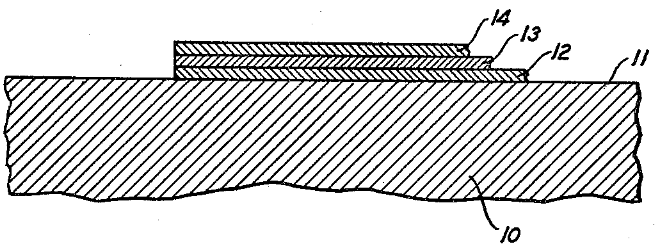
INVENTORS: P. A. BYRNES, JR.
R. SCHMIDT
BY H. W. Lockhart
ATTORNEY United States Patent Office 3,178,270

Patented Apr. 13, 1965

3,178,270
CONTACT STRUCTURE

Peter A. Byrnes, Jr., Bridgewater Township, Somerset County, and Rudolf Schmidt, Warren Township, Somerset County, N.J., assignors to Bell Telephone Laboratories, Incorporated, New York, N.Y., a corporation of New York Filed May 15, 1962, Ser. No. 194,875
3 Claims. (Cl. 29—183.5)

This invention relates to semiconductor signal translating devices. More particularly, this invention relates to electrical connections to semiconductor wafers.

In the past, various problems have arisen in providing electrodes to semiconductor devices. These problems were related to the control of the geometry of the electrode both as to surface area and to the depth of penetration, and to chemical and mechanical breakdown of the electrode.

These problems have been countered by the development of various lamellate electrodes. Although these electrodes have all but eliminated problems related to the control of the area and depth of penetration, they have not entirely eliminated the chemical and mechanical breakdown.

To the contrary, failures due to chemical and mechanical breakdown of the electrode are becoming more prevalent due to specialized processing now required for most semiconductor devices. An example of such special processing is heat treatments in excess of 700 degrees centigrade for the removal of water films adsorbed to semiconductor surfaces and for the formation of stable surface oxides. Another example is the passivation of semiconductor surfaces, particularly silicon surfaces by oxide formation as disclosed in Patent No. 2,930,722, issued March 29, 1960, to J. R. Ligenza. Here also, temperatures in excess of 700 degrees centigrade are required.

Moreover, the use of such lamellate electrodes has resulted in the tendency of detrimental complex compounds to develop at the interface between the electrode and the substrate. Such compounds, such as silicides for silicon substrates, typically have lattices incompatible with the contiguous lattices. Consequently, in such prior art structures, shear stresses are introduced, resulting in failure of the devices.

We have discovered that the use of iridium in a lamellate electrode results in a structure freer of these complex compounds and more tolerant of vigorous processing conditions.

In the preferred embodiment of this invention, electrical connection is made to a silicon wafer by a lamellate electrode comprising a palladium layer in intimate contact with the silicon, a layer of iridium, and a platinum overlayer separated from the palladium layer by the layer of iridium.

Accordingly, a feature of this invention is a lamellate electrode including an iridium layer.

A more specific feature is a lamellate electrode comprising in succession a layer of palladium, a layer of iridium and an overlayer of platinum.

The invention and its various objects and features will become apparent during the following description rendered in conjunction with the accompanying drawing.

It is to be understood that the drawing is not necessarily to scale, certain dimensions being exaggerated for the purpose of illustration.

The drawing shows in cross section a silicon wafer to which has been connected a lamellate electrode in accordance with the invention. With reference now more particularly thereto, there is shown a silicon wafer 10 on a portion of which has been superposed in succession, a palladium layer 11, an iridium layer 12 and a platinum layer 14. In the drawing these are shown as discrete layers although in practice some fusion together and intermixing of the components of the discrete layers occurs in the processing.

In a typical embodiment, as deposited initially the palladium layer 11 was about 1,000 Angstrom units thick, the iridium layer about 5,000 Angstrom units thick and the palladium layer also about 5,000 Angstrom units thick.

This embodiment was fabricated as follows. The starting material was a polished silicon slice approximately 1.5 inches in diameter by .007 inch thick and having a bulk resistivity of about .15 ohm-centimeter. The silicon surface was rendered degenerate by the diffusion of boron in accordance with well known techniques. A layer of palladium 1,000 Angstrom units thick was deposited through a molybdenum mask onto the degenerate surface. The mask had holes about .020 inch in diameter for forming a plurality of palladium dots on the silicon surface. The wafer then was heat cycled from room temperature to 800 degrees centigrade and then cooled to room temperature. The entire cycle required about twelve minutes during which the peak temperature of 800 degrees centigrade, attained after about seven minutes, was maintained for about one minute. Experiments and theory indicate that the palladium-silicon interface is liquid for about two seconds while the temperature is at 800 degrees centigrade, forming an alloyed or sintered interface and a palladium rich silicon layer which encompassed all the available palladium. The palladium coated wafer then was placed in a sputterer and a 5,000 Angstrom unit layer of iridium was deposited through the same mask. Similarly, a layer of platinum 5,000 Angstrom units thick was deposited thereover. Finally, the structure was heated over a ten minute cycle from room temperature to 750 degrees centigrade and back to room temperature in a vacuum of about $2\times10^{-5}$ millimeters of mercury. The slice was divided into individual wafers, in a number corresponding to the number of dots, by exposure to an etchant comprising six parts nitric acid to two parts hydrofluoric acid to one part acetic acid by weight.

The same process has been utilized to contact a degenerate $N^+$ silicon wafer in which phosphorus instead of boron had been introduced for forming the degenerate surface. Additionally, the same process has been utilized simultaneously on oppoiste faces of a silicon wafer into which boron and phosphorus had been diffused, respectively.

There is a considerable latitude in choosing the thickness of the various layers. The thickness of the layer of palladium may range from about 1,000 to 2,000 Angstrom units. The lower limit is chosen to insure that the liquid interface remains continuous during the heat treatment until the surface oxide is dissolved. The upper limit of 2,000 Angstrom units minimizes the edge area of the palladium layer exposed to the processing etchants.

Similarly, the thickness of the iridium layer may range from about 2,000 to 20,000 Angstrom units. The lower limit insures that the iridium film remains continuous during processing. The upper limit is as thick a film as can be tolerated without causing excessive internal stresses.

The formation of incompatible compounds at the silicon interface can be avoided by an electrode entirely of iridium. However, such an electrode is difficult to fabricate because iridium does not dissolve the troublesome surface oxides which coat most semiconductor wafers. Of course, a pure iridium electrode is feasible if one provides a clean semiconductor substrate onto which the iridium is deposited. This can be accomplished, for example, by cleaving the semiconductor wafer during the deposition of the iridium or, alternatively, by heating the wafer to between 600 to 800 degrees centigrade at a pressure of $10^{-9}$ millimeters of mercury for the preparation of a suitable surface.

These processing difficulties are overcome conveniently by utilizing the layer of palladium between the iridium and the semiconductor. While palladium does form, for example, silicides with a silicon substrate, fortunately it passes through a liquid phase with silicon. The result is a structure which accommodates itself to the neighboring lattices with the introduction of much less shear stress than would result from the solid state reactions typical of the more conventional contact metals. Moreover, this liquid phase has the added advantage of dissolving the troublesome surface oxides. Accordingly, palladium is an ideal contact metal. However, palladium is not the only material suitable, in accordance with this invention, for contacting the semiconductor wafer. Any material forming with the semiconductor surface an interface which when heated passes through a liquid phase at a temperautre over 750 degrees centigrade but lower than the melting points of either material is suitable. There is the added requirement that the liquid interface be capable of dissolving any residual oxide which might be coating the semiconductor surface. Other appropriate materials for this purpose are nickel and chromium. Palladium, nickel and chromium are not suitable materials when used as the sole material for the entire electrode because they are easily etched and do not survive the elevated procesing temperatures contemplated.

The platinum overlayer is not a necessity in accordance with this invention, particularly if the electrode is to be brazed to its encapsulation. However, platinum presents a desirable surface for the bonding of lead attachments by, for example, the thermo-compression bonding technique. When used to this end, the platinum layer can be of any thickness up to about 10,000 Angstrom units. Similarly, a gold overlayer can be used if the deposition thereof is carried out in a strongly oxidizing atmosphere. Typically, gold can be expected to form a eutectic with the silicon. This eutectic has a low melting point and fractures easily. However, the oxidizing atmosphere oxidizes the silicon before such a eutectic can form.

An electrode in accordance with this invention has been found to be quite versatile with many attending advantages. In contrast with many of the prior art lamellate electrodes, the present electrode can be connected to polished as well as rough surfaces. In addition, the electrode is characterized by a resistance to etchants. Consequently, during processing the electrode can be used as a mask. This characteristic is turned to account in dividing the semiconductor slice into individual wafers merely by exposing the processed slice to an etchant. The electrodes protect the underlying surface from the etchant while the etchant etches through the semiconductor material between the electrodes. A less obvious advantage of the electrode is that it does not penetrate to any significant extent the semiconductor surface and, accordingly, is particularly useful in devices including shallow lying junctions. The electrode is suitable for forming ohmic or rectifying connections to both P or N-type semiconductor material. For ohmic or low resistance connection the underlying semiconductor surface advantageously is rendered degenerate by prediffusing impurities into the surface or including the impurities in the palladium layer in a manner well known in the art. For rectifying connection, the underlying semiconductor is nondegenerate. A further advatage is that the materials of the electrode have a very low surface diffusion coefficient in silicon, germanium and the compound semiconductors. As a result, the materials typically do not diffuse along the surface of these semiconductor materials to form detrimental compounds or short circuits. Finally, a device equipped with electrodes in accordance with this invention may be encapsulated in an inexpensive glass enclosure without concern for the enclosed environment.

The above described specific illustrative system is susceptible of numerous and varied modifications, all clearly within the spirit and scope of this invention, as will at once be apparent to those skilled in the art. No attempt has been made to illustrate exhaustively all such possibilities.

What is claimed is:

1. A lamellate electrode in electrical and physical contact with a semiconductor wafer of silicon comprising:
   a palladium rich surface layer of silicon between 1,000 and 2,000 Angstrom units thick,
   a layer of iridium between 2,000 and 20,000 Angstrom units thick on and attached to said surface layer, and
   an overlayer of platinum less than 10,000 Angstrom units thick on and attached to said iridium layer.

2. A lamellate electrode in electrical and physical contact with a wafer of semiconductor material selected from the group consisting of silicon, germanium and the III–V semiconductor compounds comprising:
   a thin surface layer of the semiconductor wafer rich in one of the metals selected from the group consisting of palladium, nickel and chromium,
   a layer of iridium on and attached to said surface layer, and
   an overlayer of a metal selected from the group consisting of platinum and gold on and attached to said iridium layer.

3. A lamellate electrode in electrical and physical contact with a wafer of semiconductor material selected from the group consisting of silicon, germanium and the III–V semiconductor compounds comprising:
   a thin surface layer of the semiconductor wafer rich in one of the metals selected from the group consisting of palladium, nickel and chromium between 1,000 and 2,000 Angstrom units thick,
   a layer of iridium between 2,000 and 20,000 Angstrom units thick on and attached to said surface layer, and
   an overlayer less than 10,000 Angstrom units thick of a metal selected from the group consisting of platinum and gold on and attached to said iridium layer.

References Cited by the Examiner

UNITED STATES PATENTS

| | | | |
|---|---|---|---|
| 2,319,364 | 5/43 | Ziegs | 29—194 |
| 2,600,175 | 6/52 | Volterra | 29—199 |
| 2,646,616 | 7/53 | Davignon | 29—199 |
| 2,877,396 | 3/59 | Armstrong | 317—239 |
| 2,973,466 | 2/61 | Attala | 317—240 |
| 3,012,316 | 12/61 | Knau | 29—473.1 |
| 3,017,693 | 1/62 | Habu | 29—473.1 |
| 3,065,532 | 11/62 | Sachse | 29—195 |

DAVID L. RECK, *Primary Examiner.*

HYLAND BIZOT, *Examiner.*